INVENTORS
MARY L. MOORE
MARY ANNE BRESLIN
WILLIAM F. SCHMITT
BY [signature]
ATTORNEY

INVENTORS
MARY L. MOORE
MARY ANNE BRESLIN
WILLIAM F. SCHMITT
BY
ATTORNEY

United States Patent Office 3,248,703

Patented Apr. 26, 1966

3,248,703
DIGITAL DATA PROCESSOR VISUAL DISPLAY

Mary L. Moore, Livermore, Calif., and Mary Anne Breslin, Philadelphia, and William F. Schmitt, Wayne, Pa., assignors to Sperry Rand Corporation, New York, N.Y., a corporation of Delaware

Filed Mar. 24, 1961, Ser. No. 98,061
20 Claims. (Cl. 340—172.5)

Figure 1:
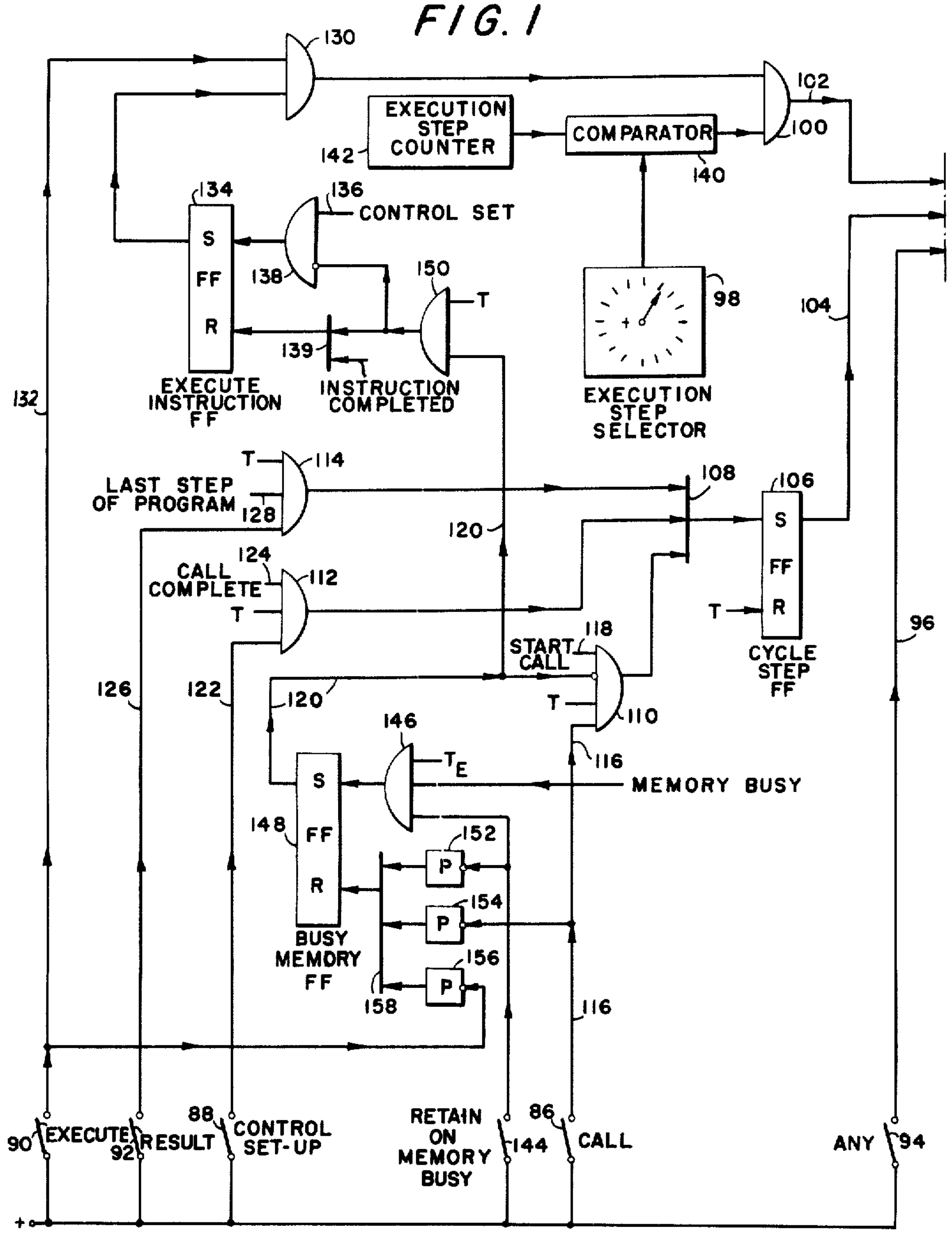

This invention relates to a visual display for a digital data processing system and more particularly to means for effecting under selected conditions or at selected times within the cycle of operation of the system a static, visual display of information at selected locations or of the state of selected monitorial or control points within a digital data processing system.

A digital data processing system has five functional sections; these are input, storage, arithmetic and logic, control and output. The input section is the means for getting both the data to be processed and the instructions for controlling the processing into the equipment. The storage section or memory provides a resting place for data put into the equipment or developed during processing operations, and for the instructions. The arithmetic and logic section processes the data according to the rules of arithmetic and a predetermined logic. The control section directs the processing operations by informing the various sections and units therein when and how they should perform. The output section receives the results of the processing.

These sections are interconnected so that information is transferred between the input and output sections and the arithmetic and logic section, between the arithmetic and logic section and the memory, and from the memory to the control section. Control signals are sent from the control section to all the sections of the system. The control section is considered as being composed of two portions. One portion receives the instructions from the storage section, interprets the received instructions to produce respective control signals to direct the system to perform the appropriate operations. The other portion of the control section, designated as the master control section, directs the general requirements for the system to proceed from one step to another in its cycle of operations.

A cycle of operations is here taken as including:

(1) extraction of an instruction word from the memory or storage section, (2) transmittal of the instruction word to the instruction interpreting section of the control section, (3) execution of the instruction in accordance with the control signals produced by the control section, and (4) transfer of the result of the execution step to a designated data register in the arithmetic and logic section or to the memory.

In order to ensure accurate and reliable results, digital data processing systems have checking features built in. One common checking feature where the system utilizes a binary coded decimal representation for each digit or character is to add a redundant check bit to the code for each digit or character so that each code group always has either an even number or an odd number of binary one bits. The code groups are then checked for parity each time they are read, transferred or written. Another form of checking is to duplicate units or operations. For example, the arithmetic unit may be duplicated and the same calculation is performed on the same data by each of the arithmetic units; verifying the result from one unit against the result from the other unit provides a check against errors in calculations. Another checking feature may be examining for and indicating the presence of invalid instructions or data codes.

An adjunct to a digital data processing system is a control console which provides the human operator with the means of communication and controlling the system. This invention provides, preferably at the control console, a static, visual display of substantially any unit or control point in the system, selectively. Besides the indicators for displaying the selected information there are provided switches and push buttons to control and select what is to be displayed, under what conditions and when in the cycle of operations of the system this display is to be effected.

One object of the invention is to be able to select for display the contents of any one of the data registers, the path for transferring information from or into the memory, the instruction receiving unit in the control section or any one of a plurality of groups of monitorial points throughout the system.

Another object of the invention is to cause a display to be effected when an error is detected within the system.

Still another object of the invention is to select that a display is to be effected during a particular step in the cycle of operations.

Yet another object of the invention is to select the time interval within the selected step in the cycle of operations that the display is to be effected.

An additional object of the invention is to select from the plurality of repetitive operations utilized to execute some instructions, one of the plurality execution steps during which a display is desired.

An additional object is to object is to be able to prevent a new display from being effected after a desired display has been effected.

A further object is to be able to prevent any new display from being effected after an error has been detected within the system.

Figure 2:
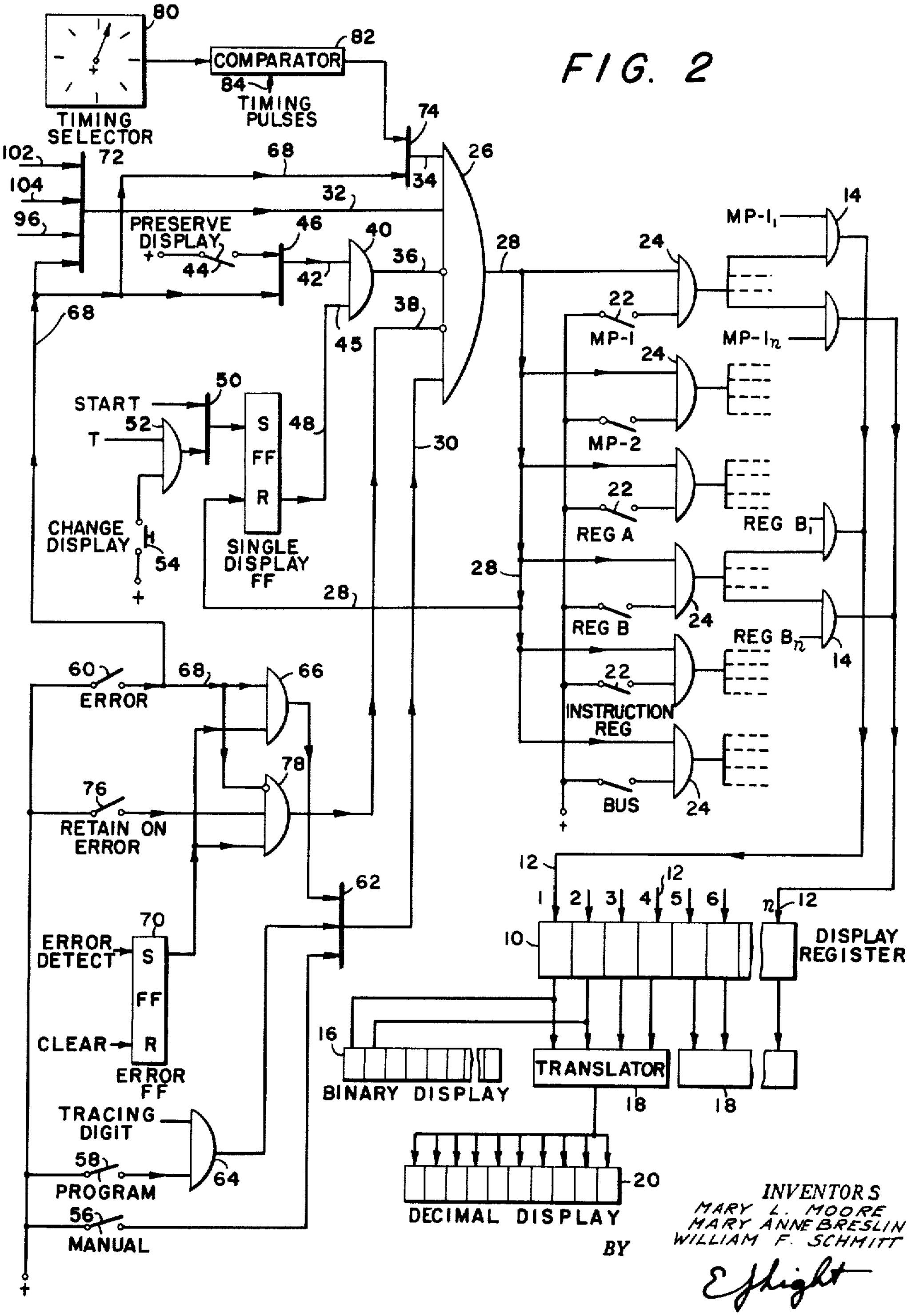

These and other objects and features of the invention will become apparent from the following specification read in conjunction with the drawings wherein:

FIGURES 1 and 2 taken together is a logical circuit arrangement embodying the invention.

The environment for this invention in the description to follow is a digital data processing system wherein data is represented by binary digits or bits and handled in parallel fashion or at least available in parallel. By parallel is meant that all the bits of a data word are simultaneously present in separate lines, channels, or other facilities. The system is further considered to be synchronously operating, that is, operating with a master timing pulse source or clock in the master control section providing timing signals for pacing the system through its cycle of operations.

The invention will be disclosed and described in logical form and reference is hereby made to the "Handbook of Automation, Computation and Control," vol. 2, published by John Wiley and Sons, Inc., New York, New York for a showing and description of the various elements logically combined in this invention.

A static display register 10 having a capacity of a computer word, that is, a number of stages $n$ equal to the number of bits comprising a computer word. Each stage has a separate input line 12 which is connected to be fed by a respective one of each of the groups of AND gates 14. The groups of gates 14 are associated respectively with data registers, etc. as will be more fully described hereinafter. The display register 10 will receive and retain the binary digital representation appearing at its inputs 12 until such time as a new input is presented to it. Such a register may be composed of *n* bistable storage elements.

Each stage of the static display register will have an indicator 16, such as a neon bulb, to present a visual indication of the state of the respective stage of the register and therefore a visual indication of the binary digital representation applied to its input 12. If an indication of the decimal equivalent of the binary representation in register 10 is desired, translation of the contents of register 10 may be performed by decoding circuitry or translators and appropriate decimal indicators actuated thereby. In the drawing a plurality of translators 18 are shown connected to receive inputs from respective portions of register 10 as would be done where the data is represented by a binary coded decimal notation calling for separate translation for each decimal digit. Of course, if the inputs to the register 10 via inputs 12 is not a data word, but a collection of isolated monitorial points, then the decimal translation would be meaningless and, in fact, for a binary coded decimal system, non-decimal digit code combinations might be present. The translators 18 might then be designed to give no output at all or an output for a special symbol to represent the receipt of a non-intelligible code combination by the translator. The output of the translator or translators 18 would be the energization of one of a number of lines to activate the visual display of the appropriate decimal digit in display unit 10. A particular light or grid of a glow discharge tube might be how the appropriate decimal digital display is achieved.

Manually operable switches 22 which are preferably so arranged that they are mutually exclusive, that is, only one switch 22 may be closed at a time and the operation of any one of switches 22 will release all others, as is well known, are provided for selecting what is to be displayed. Provision is made to display any data register (two exemplified as Reg. A and Reg. B), the path for transmission of information to or from the memory or storage section (exemplified as BUS), the instruction register for receiving the instructions for conversion to appropriate control signals (exemplified as Instruction Reg.), or various groups of monitorial points throughout the system. One group of monitorial points may be all or a portion of the controlled points for arithmetic operations, or for transfer of information or for comparison operations, or the group may include all the timing pulse source outputs and the master control signals for directing the cycle of operation steps. Two groups of monitorial points are exemplified by switches 22 labeled MP–1 and MP–2.

Each of switches 22 connects an alerting signal to a respective AND gate 24. A second input to the gates 24 is provided by AND gate 26. Gate 26 produces an output on line 28 when all the conditions for causing a new display are met as will be described hereinafter. Suffice it to say that an output from gate 26 on line 28 will enable the gate 24 alerted by the operation of its associated switch 22 to produce an output to effect the transmittal to the display register 10 through the group of gates 14 controlled thereby, of the contents of what it is desired to display.

AND gate 26 has three permissive inputs 30, 32 and 34 and two inhibiting inputs 36 and 38. Permissive input 30 may be considered as being controlled by the selected display mode, input 32 as being controlled by the selected step in the operation cycle, and input 34 as being controlled by the selected time interval within a cycle step.

Inhibiting input 36 is the output of AND gate 40 and is used to prevent a further input to the display register and thus preserve a newly effected display. Input 42 to gate 40 is controlled by the manually operated Preserve Display switch 44 and is supplied with an alerting signal via OR circuit 46 when switch 44 is closed. An alerting signal from a source other than through switch 44 will be described later.

The other permissive or enabling input to gate 40 on input 45 is presented from Single Display flip-flop 48 in its reset state. Flip-flop 48 will be placed in its reset state by the output on line 28 from AND gate 26. Flip-flop 48 is set by an output pulse from OR circuit 50 to which one or more pulses are fed by gate 52 when push button 54 is operated to alert gate 52 to pass T pulses emanating from the clock or timing pulse source. It is advisable that the flip-flop 48 be placed in a set state each time the system is put into operation and, for this purpose, a Start pulse is directed to OR circuit 50.

Thus, it is seen that closing of Preserve Display switch 44 will result in inhibiting AND gate 26 from further operation after gate 26 has once produced an output. This results from the "feed-back" path via line 28 to reset flip-flop 48, resulting in the application via line 45 of an enabling signal for gate 40, the output from which provides the inhibiting signal to line 36.

Inhibiting input 38 to gate 26 will be described hereinafter.

The display mode selections are (1) Manual, (2) Program, and (3) Error, and are selected by the operation of the respective one of mutually exclusive switches 56, 58 and 60.

Operation of the Manual display mode switch 56 provides a permissive signal to input 30 of gate 26 via OR circuit 56. Operation of the Program display mode switch provides an alerting signal to AND gate 64. The enabling or other permissive input to gate 64 comes from the control circuits wherein a sensing circuit loks at a particular binary digit position in all instructions and gives an output when a bit is present. This constitutes a tag which is here termed the Tracing Digit, and it constitutes a convenient method to, for example, follow the progress of a particular program or routine.

Operation of Error display mode switch 60 places an alterting signal on AND gate 66 via line 68. The enabling or second permissive input to gate 66 is derived from the set output of Error flip-flop 70. Flip-flop 70 is placed in a set state by the error detection circuits in the system detecting an error and is reset by the production of a clear signal to clear or reset the error detection circuits. This clear signal may result from the operation of a push button to provide a signal to reset the error detection circuits similar to the manner in which a signal is produced to set Single Display flip-flop 48 by operation of push button 54, as previously described. The output from gate 66 provides an input to OR circuit 62 resulting in a permissive signal on input 30 to gate 26.

The signal on line 68, as a result of the closing of Error mode switch 54, is also applied as an input to OR circuit 72, the output from which is applied as input 32 to gate 26, and is also applied as an input to OR circuit 74, the output from which is applied as input 34 to gate 26. Accordingly, the closing of switch 60, via OR circuits 72 and 74 unconditionally provides two of the three permissive inputs to gate 26. These inputs, if either the Manual or Program display modes are selected, are controlled by the step in operation cycle selection and time interval selection, respectively. For Error mode display, it is desired that the effecting of a new display be without regard to anything other than the detection of an error, and this is achieved by applying permissive signals on inputs 32 and 34 of AND gate 26 and alerting AND gate 66 to provide the third permissive input 30 to gate 26; gate 66 receives an enabling signal from flip-flop 70 when an error is detected within the system.

It is preferable that the display resulting from the detection of an error be maintained pending manual intervention. This is ensured by having the signal on line 68 also applied as an input to OR circuit 46. Thus, whether switch 44 is closed or not, the Preserve Display circuit arrangement will be in operation, and, as soon as an output is produced from gate 26 on line 28, by means of flip-flop 48 and gate 40, the gate 26 will be inhibited from further operation because of the signal on inhibiting input 36.

Associated with the display mode selection switches but operable independently thereof is Retain On Error switch 76. Closing of switch 76 applies an alerting signal to AND gate 78. The other permissive or enabling input to gate 78 comes from the set output of Error flip-flop 70. The output of gate 78 is applied as inhibiting input 38 to AND gate 26. Operation of Error display mode switch 60 provides an inhibiting signal to gate 78 via line 68.

Thus it is seen that the operation of Retain On Error switch 76 together with either the Manual or Program display mode switches 56 or 58 will cause the existing display to be retained when an error is detected. In Error display mode, gate 78 is inhibited from producing an output and so Retain On Error is overridden and a new display and preservation of the new display is effected when an error is detected as previously described.

With each step in the cycle of operation of the processing system being divided into a number of time intervals, an interval being the time between successive clock pulses, provision is made to select the particular time interval within the selected step in the cycle of operation at which a display is desired. Timing pulse selector 80 permits the application of a signal to comparator 82 indicative of the timing pulse marking the initiation of the desired interval. The timing pulses are directed to comparator 82 on line 84. When the timing pulse designated by selector 80 is applied to comparator 82 a pulse is delivered by the comparator to OR circuit 74 to be passed as a permissive signal to input 34 of AND gate 26. Comparator 82 may comprise a plurality of AND gates each having a different timing pulse as one permissive input and a second permissive input from a respective contact of the timing pulse selector 80 with the outputs of each of the AND gates connected as an input to an OR circuit.

Selection of the step in the operation cycle during which a display is desired is controlled by the mutually exclusive switches 86, 88, 90, 92 and 94 labeled respectively, Call, Control Set-up, Execute, Result and Any, and related circuitry resulting in a signal on input 32 of gate 26 via OR circuit 72 for the period during which the selected step is being carried out.

The Any switch 94 is operated when it is desired to effect a new display on each step in the operation cycle. Closing of switch 94 applies signal potential to OR circuit 72 via line 96 for as long as the switch 94 is kept closed. This is useful in conjunction with operation of the system one step at time.

Since the execution of the instruction (Execute) step may require the repetition of the same procedure a number of times, with each repetition occupying a full cycle step time, provision is made to select the particluar one of these plural steps during which a display is to be effected. For this purpose the Execution Step Selector 98 is present, and the signal on input 32 to enable gate 26 to produce an output is derived from AND gate 100 via line 102 to OR circuit 72. The operation of this circuit will be described hereinafter.

The permissive signal for gate 26 on input 32 for the other cycle of operation step selections is obtained from the set output 104 of Cycle Step flip-flop 106. Flip-flop 106 is set by the output of OR circuit 108 which has three inputs respectively controlled by outputs of AND gates 110, 112, and 114. The closing of Call (call for an instruction word from memory) switch 86 applies an alerting signal to AND gate 110 via line 116. A second alerting or permissive signal to gate 110 is presented by the master control section of the system initiating the Call step and arrives via line 118. Finally, the third permissive input to gate 110 is a T pulse which comes from the timing pulse source and is the timing pulse for the beginning of a cycle step. In the absence of a signal on inhibiting input 120 as will be described hereinafter, gate 110 will actuate OR circuit 108 to set flip-flop 106. The flip-flop 106 will be reset by the next T pulse and so will remain in its set state for the time interval of a cycle step. As previously mentioned, the set output from flip-flop 106 actuates OR circuit 72 to provide a permissive input on input 32 of gate 26. Thus input 32 of gate 26 receives a permissive signal all during the step wherein an instruction word is extracted from the memory or storage section.

Closing of Control Set-up (instruction word into control section and setting-up of control signals thereby) switch 88 applies an alerting signal to gate 112 via line 122. A second permissive input to gate 112 comes from the master control section terminating the Call step via line 124. The third permissive input to gate 112 is the T pulse. Thus gate 112 passes the T pulse initiating the Control Set-up step which actuates OR circuit 108 to set the Cycle Step flip-flop 106 which is reset by the next presented T pulse. As a result input 32 of gate 26 receives a permissive input all during the cycle step wherein the control section receives an instruction word and effects control signals relating thereto by receiving the output of flip-flop 106 via line 104 and OR circuit 72.

Likewise gate 114, which receives an alerting signal on line 126 through closed Result (transfer result to designated location) switch 92, a second alerting signal on line 128 from the master control section terminating the execution of the instruction step and the T pulse, actuates OR circuit 108 to set the Cycle Step flip-flop 106 to effect a permissive signal on input 32 of gate 26 all during the Result cycle step.

As previously pointed out, the execution of the instruction step (Execute) may require a plurality of step times to be carried out. There is thus provided AND gate 130 which is alerted on line 132 as a result of closing Execute switch 90. The enabling or second permissive input to gate 130 is derived from the set output of Execute Instruction flip-flop 134. Flip-flop 134 is set by a master control section signal terminating the Control Set-up step arriving on line 136 and passing through gate 138. Flip-flop 134 is reset by a master control section signal terminating the Execute cycle step via OR circuit 139. Accordingly, flip-flop 134, through its set state output permits gate 130 to operate to provide an alerting input to gate 100 all during the execution of the instruction step.

The other permissive input to gate 100 arrives from the output of comparator 140. Selection of the particular one of the plurality of steps necessary to completely execute an instruction during which a display is to be effected is made in Execution Step Selector 98 and the output from Selector 98 is fed as one input to comparator 140. The other input to comparator 140 is the output from the Execution Step Counter 142 which gives an output at the beginning of each successive step for performing the complete execution of an instruction. Comparator 140 is similar to comparator 82; Execution Step Selector 98 is similar to Timing Pulse Selector 80; and Execution Step Counter provides outputs in the manner similar to the timing pulse as applied to comparator 82. An output from comparator 140 will be applied as input to gate 100 during the selected execution step, and the output from gate 100 via line 102 and OR circuit 72 will appear as a permissive signal on input 32 of gate 26.

The step of calling for and extracting an instruction from the memory (Call) of course requires ability to have access to the memory. The step of executing an Instruction (Execute) may also require access to the memory for an operand. It is desirable to be able to prevent a new display from being effected during either the Call or Execute steps if access to the memory is prevented because the memory is in use for another reason. For this purpose there is provided a Retain on Memory Busy switch 144 in association with the step in cycle selector switches but operable independently thereof.

Closing of switch 144 applies an alerting signal to

AND gate 146. The master control section produces a signal when access to the memory is denied because the memory is in use; this signal is applied to gate 146 as a permissive signal. The third permissive input to gate 146 is a timing pulse $T_E$, occurring earlier in time than does the T pulse described earlier in this description. When the $T_E$ pulse finds gate 146 fully alerted it is passed by gate 146 to place Busy Memory flip-flop 148 in a set state. The set output from flip-flop 148 on line 120 inhibits gate 110 associated with the Call step selection and alerts AND gate 150 associated with the Execute step selection. Gate 150, when alerted by the output of flip-flop 148 on line 120 passes a T pulse from the master clock pulse source to inhibit gate 138 and thereby the setting of flip-flop 134 as well as to be passed by OR circuit 139 to ensure that flip-flop 134 is in a reset state.

The reason for using an earlier timing pulse $T_E$ to set Busy Memory flip-flop 148 is to allow time for this flip-flop to assume its set state and to have the output therefrom on line 120 present to inhibit gates 110 and 150 when the later T pulse is applied to these gates. Flip-flop 148 is restored by manually releasing or opening either the Retain On Busy Memory switch 144, the Call switch 146 or the Execute switch 90. The opening of one of these switches will cause a pulse to be generated by the respective one of pulse circuits 152, 154 or 156, which pulse will be passed by OR circuit 158 to reset flip-flop 148.

It will be obvious to those skilled in the art that various changes may be made without departing from the spirit of the invention and therefore the invention is not limited to what is shown and described in the specification, but only as indicated in the appended claims.

What is claimed is:

1. In a digital data processing system wherein data and instructions are represented by digital codes, said system comprising a plurality of data registers and error detection circuits, said digital data processing system characterized by the inclusion of a static display register, a plurality of AND gating means for connecting the input of said display register to receive the contents of a respective one of said data registers, manually operable switching means for choosing a selected one of said gating means, and circuit means for providing an enabling signal to said gating which has been selected, means when an error is detected by said error detection circuits said enabling signal causing the transfer of said contents of a respective one of said data registers to said display register.

2. In a digital data processing system as set forth in claim 1, further characterized by the inclusion of disabling circuit means responsive to said enabling signal for maintaining disabled said circuit means for providing an enabling signal, and switching means for resetting said disabling circuit means.

3. In a digital data processing system wherein data and instructions are represented by digital codes, said system including error detection circuits, said digital data processing system characterized by the inclusion of a static display register, a plurality of gating means connecting each of the digital inputs of said display register to monitorial circuits to receive the information at a respective one of a group of monitorial points within the system, and circuit means for providing an enabling signal and for selecting any one of said gating means when an error is detected by said error detection circuits, said enabling signal causing the transfer of said information to said display register.

4. In a digital data processing system as set forth in claim 3, further characterized by the inclusion of circuit means responsive to said enabling signal for maintaining disabled said circuit means for providing an enabling signal, and switching means for resetting said disabling circuit means.

5. In a digital data processing system wherein data and instructions are represented by digital codes, said system including error detection circuits, said digital data processing system characterized by the inclusion of a static display register, a plurality of AND gating means connecting each of the digital inputs of said display register to monitorial circuits to receive the information at respective one of a selected group of monitorial points within hte system, manually operable switching means for selecting the gating means associated with the selected group of monitorial points, and circuit means for providing an enabling signal to said gating means when an error is detected by said error detection circuits, said enabling signal causing the transfer of said information to said display register.

6. In a digital data processing system as set forth in claim 5, further characterized by the inclusion of disabling circuit means responsive to said enabling signal for maintaining disabled said circuit means for providing an enabling signal, and switching means for resetting said disabling circuit means.

7. In a digital data processing system wherein data and instructions are represented by digital codes, said system including a storage section, a transmission path for transferring information to and from said storage section and error detection circuits, said digital data processing system characterized by the inclusion of a static display register, a plurality of gating means for connecting the input of said display register to receive the digital information present on the storage transmission path, and circuit means for providing an enabling signal to said gating means when an error is deteced by said error detection circuits, said enabling signal causing the transfer of said digital information present to said static display register.

8. In a digital data processing system as set forth in claim 7, further characterized by the inclusion of disabling circuit means responsive to said enabling signal for maintaining disabled said circuit means for providing an enabling signal, and switching means for resetting said disabling circuit means.

9. In a digital data processing system wherein data and instructions are represented by digital codes, said system including a control section for receiving instructions and producing appropriate control signals and error detection circuits, said digital data processing system characterized by the inclusion of a static display register, gating means for connecting the input of said display register to receive the contents of the instruction receiving unit in said control section, and circuit means for providing an enabling signal to said gating means when an error is detected by said error detection circuits said enabling signal causing the transfer of said contents of the instruction receiving unit to said static display register.

10. In a digital data processing system as set forth in claim 9, further characterized by the inclusion of disabling circuit means responsive to said enabling signal for maintaining disabled said circuit means for providing an enabling signal, and switching means for resetting said disabling circuit means.

11. In a digital data processing system wherein data and instructions are represented by digital codes, said system including a storage section, a transmission path for transferring data and instructions to and from said storage section, a control section for receiving instructions and producing appropriate control signals, a plurality of data registers and error detection circuits, said digital data processing system characterized by the inclusion of a static display register, a plurality of AND gating means connecting the input of said display register to receive either the information being transferred along the storage section transmission path, the contents of a selected one of said data registers, the contents of the instruction receiving unit in the control section, or a selected one of a plurality of groups of monitorial points within said system, manually operable switching means for choosing a selected one of said gating means, and circuit means for providing an enabling signal to said gating means when an error is detected by said error detection circuits said enabling signal causing the transfer of the information being transmitted to said AND gate to said display register.

12. In a digital data processing system as set forth in claim 11, further characterized by the inclusion of disabling circuit means responsive to said enabling signal for maintaining disabled said circuit means for providing an enabling signal, and switching means for resetting said disabling circuit means.

13. In a digital data processing system wherein data and instructions are represented by digital codes, said system including a storage section, a transmission path for transferring data and instructions to and from said storage section, a control section for receiving instructions and producing appropriate control signals, and a plurality of data registers, wherein a cycle of operation includes the steps of: (1) extraction of an instruction word from said storage section, (2) transmittal of said instruction word via said transmission path to said control section, (3) execution of the instruction on the data specified by the instruction word in accordance with the control signals produced by said control section, and (4) transfer of the result of the operation to a designated one of said data registers or to said storage section via said transmission path; said digital data processing system characterized by the inclusion of a static display register, a plurality of AND gating means connecting the input of said display register to receive either the information being transferred along the storage section transmission path, the contents of a selected one of said data registers, the contents of the instruction receiving unit in the control section, or a selected one of a plurality of groups of monitorial points within said system, manually operable switching means for choosing a selected one of said gating means, and circuit means for providing an enabling signal to said gating means during a selected one of said cycle of operation steps.

14. In a digital data processing system as set forth in claim 13, further including error detection circuits characterized by the inclusion of disabling circuit means for disabling said circuit means for providing an enabling signal when an error is detected by said error detection circuits.

15. In a digital data processing system as set forth in claim 13, further including a second manually operable switching means for selecting the cycle of operation step during which a display is to take place, characterized by the inclusion of disabling circuit means for disabling said circuit means for providing an enabling signal when step (1) of the cycle is selected by said second manually operable switching means and said storage section transmission path is busy for another purpose.

16. In a digital data processing system wherein data and instructions are represented by digital codes, said system including a storage section, a transmission path for transferring data and instructions to and from said storage section, a control section for receiving instructions and producing appropriate control signals, a plurality of data registers, and a timing pulse source, wherein a cycle of operation includes the steps of: (1) extraction of an instruction word from said storage section, (2) transmittal of said instruction word via said transmission path to said control section, (3) execution of the instruction on the data specified by the instruction word in accordance with the control signals produced by said control section, and (4) transfer of the result of the operation to a designated one of said data registers or to said storage section via said transmission path, and each of said cycle of operation steps consumes a number of timing pulse intervals; said digital data processing system characterized by the inclusion of a static display register, a plurality of AND gating means connecting the input of said display register to receive either the information being transferred along the storage section transmission path, the contents of a selected one of said data registers, the contents of the instruction receiving unit in the control section, or a selected one of a plurality of groups of monitorial points within said system, manually operable switching means for choosing a selected one of said gating means, and circuit means for providing an enabling signal during a selected time interval within a selected one of said cycle of operation steps.

17. In a digital data processing system as set forth in claim 16, further including error detection circuits characterized by the inclusion of circuit means for disabling said circuit means for providing an enabling signal when an error is detected by said error detection circuits.

18. In a digital data processing system as set forth in claim 16, further including a second manually operable switching means for selecting the cycle of operation step during which a display is to take place, characterized by the inclusion of disabling circuit means for disabling said circuit means for providing an enabling signal when step (1) of the cycle is selected by said second manually operable switching means and said storage section transmission path is busy for another purpose.

19. In a digital data processing system wherein data and instructions are represented by digital codes, said system including a storage section, a transmission path for transferring data and instructions to and from said storage section, a control section for receiving instructions and producing appropriate control signals, a plurality of data registers, and a timing pulse source, wherein a cycle of operation includes the steps of: (1) extraction of an instruction word from said storage section, (2) transmittal of said instruction word via said transmission path to said control section, (3) execution of the instruction on the data specified by the instruction word in accordance with the control signals produced by said control section, and (4) transfer of the result of the operation to a designated one of said data registers or to said storage section via said transmission path, wherein each of said cycle of operation steps consumes a number of timing pulse intervals and certain instructions require a number of successive repetitions of step (3) of said cycle of operation, said digital data processing system characterized by the inclusion of a static display register, a plurality of AND gating means connecting the input of said display register to receive either the information being transferred along the storage section transmission path, the contents of a selected one of said data registers, the contents of the instruction receiving unit in the control section, or a selected one of a plurality of groups of monitorial points within said system, manually operable switching means for choosing a selected one of said gating means, and circuit means for providing an enabling signal during a selected time interval during a selected one of the successive performances of the execution of the instruction step.

20. In a digital data processing system as set forth in claim 19, further including error detection circuits, characterized by the inclusion of disabling circuit means for disabling said circuit means for providing an enabling signal when an error is detected by said error detection circuits.

References Cited by the Examiner

UNITED STATES PATENTS

| | | | |
|---|---|---|---|
| 2,826,359 | 3/1958 | Deerhake et al. | 340—172.5 |
| 3,037,192 | 5/1962 | Everett | 340—172.5 |
| 3,067,407 | 12/1962 | Schaaf | 340—172.5 |

ROBERT C. BAILEY, *Primary Examiner.*

JOHN F. BURNS, MALCOLM A. MORRISON, *Examiners.*